(12) United States Patent
Kalavacharla et al.

(10) Patent No.: US 7,594,141 B2
(45) Date of Patent: Sep. 22, 2009

(54) APPARATUS, SYSTEM, AND METHOD FOR SIGNALING LOGICAL ERRORS IN AN EIS REMOTE FUNCTION CALL

(75) Inventors: Muralidhar Kalavacharla, Sunnyvale, CA (US); Zafrulla Khan, Fremont, CA (US); Peter Bow Kwong Lee, Foster City, CA (US); Sandeep Raghav, Fremont, CA (US); Alan Michael Wintroub, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 11/420,654

(22) Filed: May 26, 2006

(65) Prior Publication Data

US 2007/0294597 A1 Dec. 20, 2007

(51) Int. Cl.
*G06F 11/00* (2006.01)
(52) U.S. Cl. .................. 714/38; 714/4; 714/26
(58) Field of Classification Search .......... 714/4, 714/26, 38
See application file for complete search history.

(56) References Cited

U.S. PATENT DOCUMENTS

| | | | | |
|---|---|---|---|---|
| 6,473,659 B1 * | 10/2002 | Shah et al. | ............... | 700/79 |
| 6,523,027 B1 | 2/2003 | Underwood | ............... | 707/3 |
| 6,609,128 B1 | 8/2003 | Underwood | ............... | 707/10 |
| 6,634,000 B1 * | 10/2003 | Jammu et al. | ............... | 714/37 |
| 6,957,234 B1 | 10/2005 | Steinbach | ............... | 707/201 |
| 2003/0172368 A1 * | 9/2003 | Alumbaugh et al. | ........ | 717/106 |
| 2004/0044631 A1 * | 3/2004 | Walker et al. | ............... | 705/59 |
| 2004/0153791 A1 * | 8/2004 | Arend | ............... | 714/26 |
| 2005/0021354 A1 * | 1/2005 | Brendle et al. | ............... | 705/1 |
| 2006/0242194 A1 * | 10/2006 | Tsyganskiy et al. | ...... | 707/103 R |

OTHER PUBLICATIONS

Brahim Medjahed et al. "Business-to-business interactions: issues and enabling technologies" VLDB Journal (2003) 12: 59-85.
Luciano Baresi et al. "Smart Monitors for Composed Services" ICSOC (2004).
Dr. Tillman P. Otto "SAPL-APL as Client and Server for SAP R2/R3 Systems" APL 2002 Madrid Proceedings.

* cited by examiner

*Primary Examiner*—Robert Beausoliel
*Assistant Examiner*—Charles Ehne
(74) *Attorney, Agent, or Firm*—Kunzler & McKenzie (57) ABSTRACT

An apparatus, system, and method are disclosed to signal a logical error in a function call made by an integration adapter. The apparatus includes a communication module, a code extraction module, a comparison module, and an error report module. The communication module receives a business object having an error dictionary in response to a function call. The code extraction module extracts an error code value from the business object based on an error code location identifier. The comparison module compares the error code value to an associated error code in the error code dictionary. The error report module signals a logical error in the function call.

36 Claims, 5 Drawing Sheets

APPARATUS, SYSTEM, AND METHOD FOR SIGNALING LOGICAL ERRORS IN AN EIS REMOTE FUNCTION CALL

BACKGROUND OF THE INVENTION

1. Field of the Invention

This invention relates to logical error handling in an enterprise information system and more particularly relates to logical error handling in an SAP remote function call.

2. Description of the Related Art

Systeme, Anwendungen, Produkte in der Datenverarbeitung, or Systems, Applications, and Products in Data Processing (SAP), is an enterprise information and management package that is used worldwide. The SAP system tracks and manages data relevant to an enterprise, including sales, production, finance, accounting, and human resources. Other enterprise information systems (EIS's) include Ariba, Clarify CRM, eMatrix, i2, JD Edwards OneWorld, MetaSolv Applications, Oracle Applications, PeopleSoft Enterprise, Portal Infranet, Siebel Business Applications, and SunGuard FRONT ARENA.

SAP software is highly customizable to fit a customer's needs, and contains many tools for the integration and linking of third party systems and software. It also runs on multiple hardware platforms. SAP data typically resides in a central database that is shared by SAP components. A variety of databases may be used for the central database, including Oracle, Informix, Online, Adabas, DB2, DB/400, and Microsoft SQL Server 6.

Remote function Modules (RFMs) allow access to SAP data from either within SAP or from other development platforms external to SAP that support the Remote Function Call (RFC) protocol. Other enterprise systems have similar interfaces. In general, an RFM refers to any module configured to allow access to EIS data. Business application programming interfaces (BAPIs) are RFMs that are provided by SAP. Third parties also contribute RFMs that typically conform to the conventions employed by the BAPIs in data formats and error handling. One objective of the RFMs is to provide a higher level of integration between SAP and external applications and systems. The SAP Java Connector (JCo) is an API that provides Java applications access to RFM's.

The error handling convention set by the BAPIs and used by other RFMs is to throw an exception when syntax errors occur, like missing, misspelled, or incorrect settings or data in the remote function call. However, when a logical error occurs, the convention is that no exception is thrown.

Because the RFCs return a business object when a logical error occurs, and because no JCo exception is thrown, the integration adapter that passed the RFC to access SAP will return the table or structure business object to the integration broker, and on to the calling entity, without any signal that a logical error has occurred. Logical error discovery and handling, therefore, is left to the calling entity, the module, adapter, third party application, client, or user that originally made the call. Each BAPI and other RFM may use different types of business objects with different schemas, and having different error codes. Because of these individually defined schemas and codes, every calling entity must track both the error codes and the business object schemas of every RFC that the calling entity uses.

From the foregoing discussion, it should be apparent that a need exists for an apparatus, system, and method for signaling logical errors in SAP. Beneficially, such an apparatus, system, and method would also offer faster, central signaling of logical errors, with loose coupling flexibility.

SUMMARY OF THE INVENTION

The present invention has been developed in response to the present state of the art, and in particular, in response to the problems and needs in the art that have not yet been fully solved by currently available logical error handling methods. Accordingly, the present invention has been developed to provide an apparatus, system, and method for the signaling of logical errors in an EIS remote function call that overcome many or all of the above-discussed shortcomings in the art.

The apparatus to signal a logical error in an EIS remote function call is provided with a plurality of modules configured to functionally execute the necessary steps of receiving a table or structure business object (BO), extracting an error code value, comparing the error code value to an error code from an error dictionary, and signaling a logical error. These modules in the described embodiments include a communication module, a code extraction module, a comparison module, an error report module, a warning module, a logical error exception module, a detail extraction module, an error dictionary definition module, a user interface module, an error parameter discovery module, and an error dictionary validation module.

In one embodiment, the communication module receives a business object having an error dictionary in response to a remote function call. In another embodiment, the error dictionary has one or more logical error definitions, each logical error definition having an error code, an error code path, and an error description path.

In one embodiment, the code extraction module extracts an error code value from the business object based on an error code location identifier. In another embodiment, the error code location identifier is in the error dictionary.

In one embodiment, the comparison module compares the error code value to an associated error code in the error dictionary based on a comparison condition. In another embodiment, the associated error code has one or more error code values.

In one embodiment, the error report module signals a logical error in the remote function call in response to the error code value and the error code satisfying the comparison condition. In another embodiment, the warning module signals the logical error by recording the logical error in an error log. In a further embodiment, the logical error exception module signals the logical error by throwing an exception having the error code value in response to the logical error.

In one embodiment, the detail extraction module extracts an error description from the business object. In another embodiment, the detail extraction module extracts an error description from the business object based on an error description location identifier in the error dictionary.

In one embodiment, the error dictionary definition module defines an error dictionary with one or more error parameters, the error parameters associated with a logical error in a remote function call. In another embodiment, the user interface module sets one or more error parameters in the error dictionary based on input from a user. In a further embodiment, the error parameter discovery module discovers one or more error parameter definitions from a remote function call.

In one embodiment, the error dictionary validation module validates the format of entries within the error dictionary. In another embodiment, the error dictionary validation module validates the syntax of the error dictionary.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
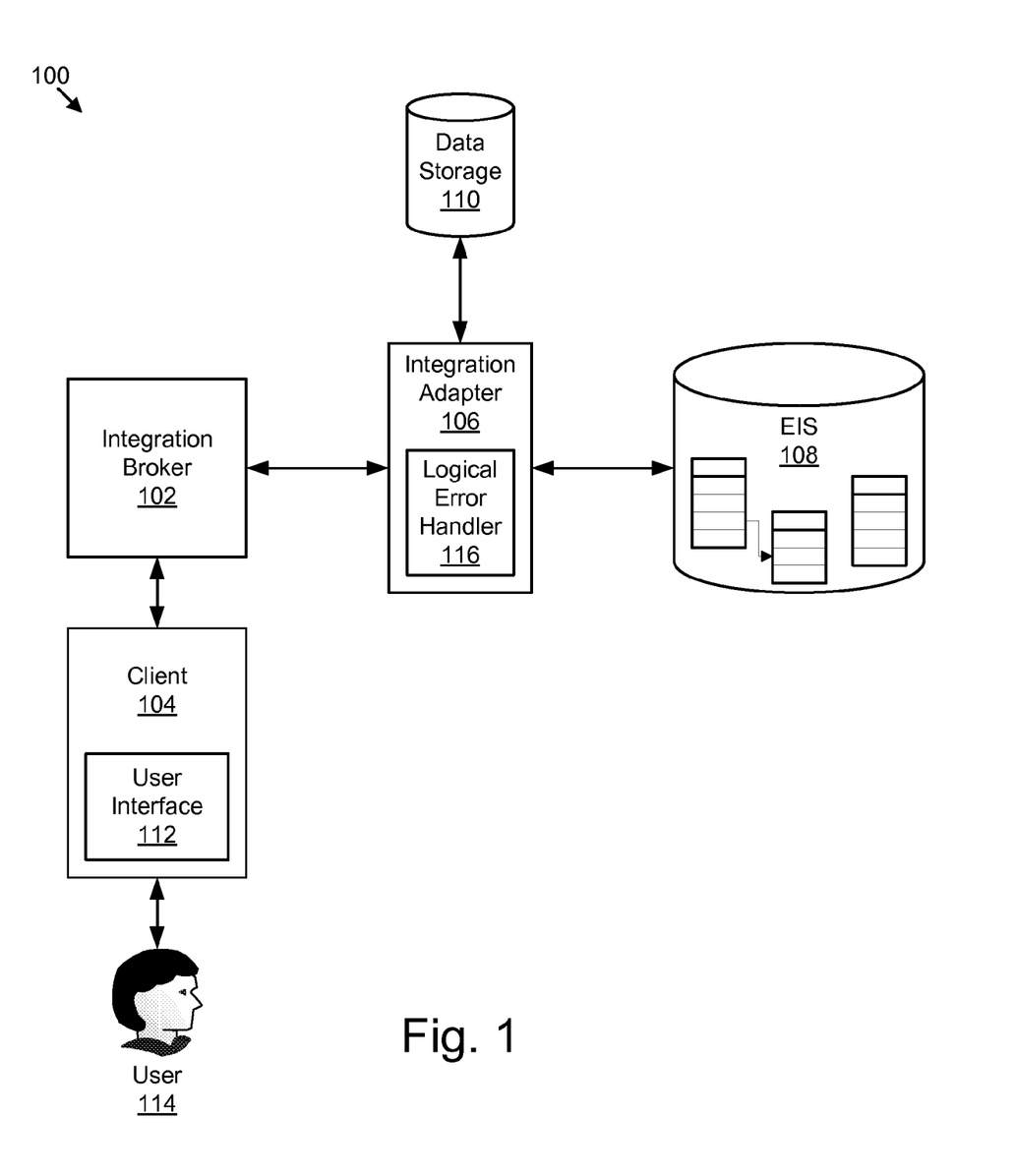
FIG. 1 is a schematic block diagram illustrating one embodiment of an EIS logical error signaling system in accordance with the present invention.

FIG. 1 depicts one embodiment of an EIS logical error signaling system 100. A logical error is an error that occurs when the EIS can properly process a remote function call, but the remote function call does not produce the desired results, meaning that the actions or data requested by the remote function call fail. Logical errors may include time out errors, errors moving or confirming data, or errors accessing data due to objects in the EIS that are blocked because of concurrent access locks. The illustrated SAP database access system 100 may comprise an integration broker 102, a client 104, an integration adapter 106, an EIS 108, a data storage 110, a user interface 112, a user 114, and a logical error handler 116.

In one embodiment, the integration broker 102 is coupled to both the client 104 and the integration adapter 106, facilitating communication between them. The integration broker 102 may also be coupled to other integration adapters.

The client 104 is an entity in communication with the integration broker 102. The client 104 may be an EIS, an integration adapter, a development environment, a business application, or another type of module. In one embodiment, the client 104 defines an error dictionary with one or more error parameters associated with a logical error in an EIS remote function module. In another embodiment, the EIS remote function module is an SAP RFC call. The client 104 may define the error dictionary using input from other sources.

One example of an error dictionary embedded in a business object is provided and described in more detail with reference to FIG. 2. In general, an error dictionary is a data structure defining one or more logical errors that could occur in a predefined remote function call. The error dictionary may be stored in many formats including, extensible markup language (XML), as an XML schema definition (XSD), or in another data format. The error dictionary may also be stored as application specific information (ASI) in a business object. A business object is an object which represents an item, event, or entity, associated with a remote function call. A business object includes the attributes, parameters, and information associated with the item, event, or entity that the business object represents.

Storing the error dictionary as ASI in a business object provides the system 100 with loose coupling flexibility. Passing the error dictionary between modules, instead of storing the error dictionary in a data repository, reduces the interdependencies between the modules. Passing the error dictionary also reduces the risk that changes in one module will create unwanted changes in another module, and increases the ability to add, replace, or change individual modules.

In one embodiment, the integration adapter 106 provides access to the EIS 108. The integration adapter 106 provides a common interface for other adapters, applications, or modules to make remote function calls to the EIS 108. In one embodiment, the integration adapter 106 is an SAP adapter, and provides an interface for other adapters, applications, or modules to call BAPIs and other RFMs.

The EIS 108 may comprise an EIS that supports third party access. In one embodiment the EIS 108 tracks and manages data relevant to an enterprise, including sales, production, finance, accounting, and human resources. The EIS 108 could be SAP, Ariba, Clarify CRM, eMatrix, i2, JD Edwards OneWorld, MetaSolv Applications, Oracle Applications, PeopleSoft Enterprise, Portal Infranet, Siebel Business Applications, SunGuard FRONT ARENA, or another EIS.

In one embodiment, data storage 110 is coupled to the integration adapter 106. The data storage 110 may be a type of electronic data repository. The integration adapter 106 may store or manipulate data in the data storage 110 such as business object definitions, remote function call responses, or error dictionaries.

In one embodiment, the user interface 112 is coupled to the client 104. The user interface 112 communicates with the user 114. In one embodiment, the user interface 112 receives error parameters from the user 114, which are then included in an error dictionary by the client 104. The integration adapter 106 may also define an error dictionary using input provided by the user 114 through the user interface 112.

In one embodiment, the logical error handler 116 is coupled to the integration adapter 106. One example of the logical error handler 116 is provided and described in more detail with regard to FIG. 3. In general, the logical error handler 116 discovers and signals logical errors in remote function calls passed on by the integration adapter 106. This may include receiving a business object having an error dictionary in response to a remote function call, extracting an error code value from the business object based on an error code location identifier, comparing the error code value to an associated error code in the error dictionary based on a comparison condition, and reporting a logical error in the remote function call in response to the error code value and the error code satisfying the comparison condition. In one embodiment, the logical error handler 116 is an SAP logical error signaling tool that may be installed on an SAP adapter.

Figure 2:
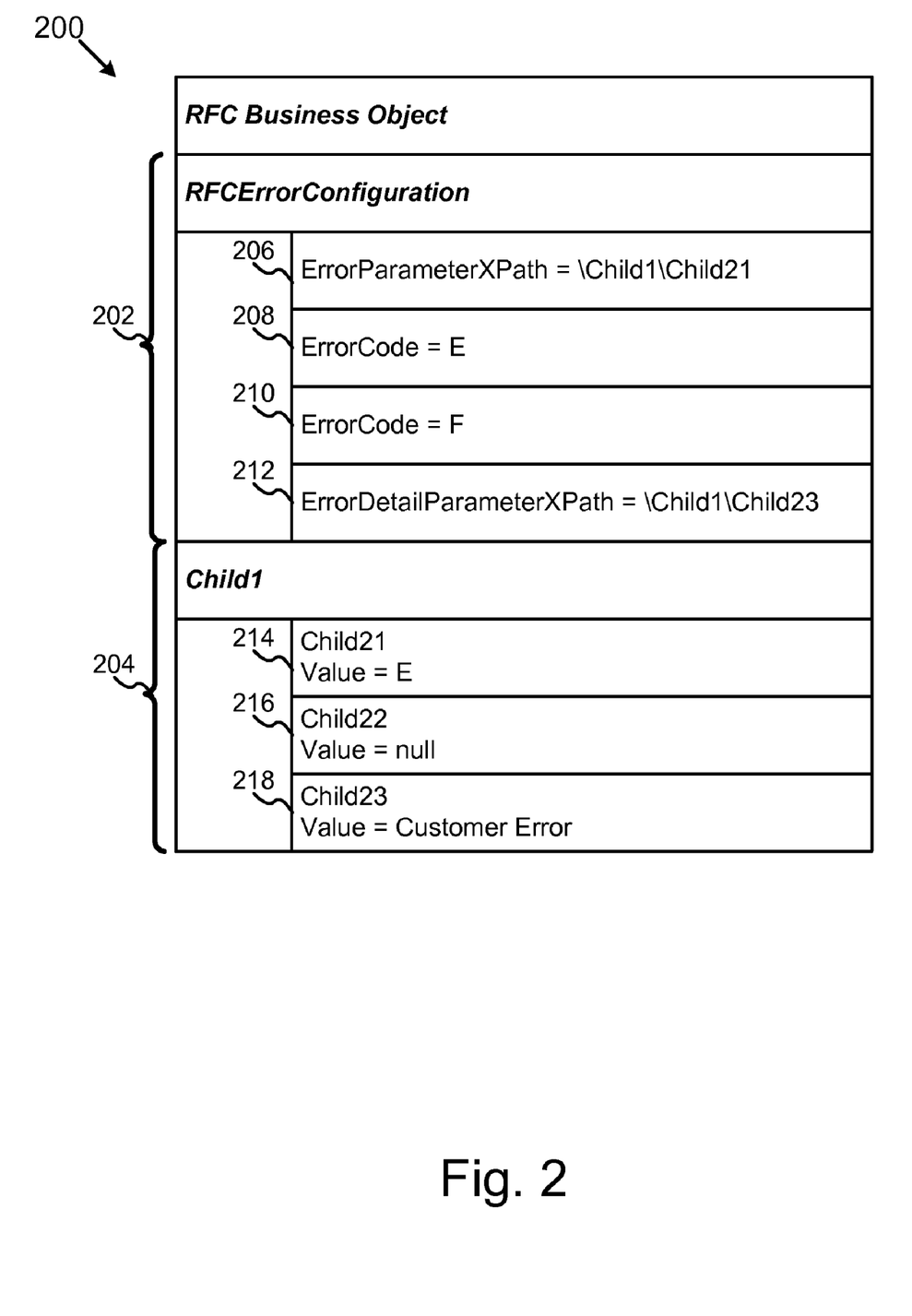
FIG. 2 is a block diagram illustrating one embodiment of a business object with an error dictionary in accordance with the present invention.

FIG. 2 depicts one embodiment of a business object 200 with an embedded error dictionary 202. In one embodiment, the business object 200 is a return business object from an EIS remote function call. In another embodiment, the business object 200 is a return business object from an SAP RFM. The business object 200 may be stored as XML, as an XSD, or in another data format. The business object 200 has an error dictionary 202 and return error data 204.

In one embodiment, the error dictionary 202 is embedded in the business object 200 and passed with business object 200. The error dictionary 202 is a data structure defining one or more logical errors that could occur in response to the remote function call. In one embodiment, the error dictionary 202 has an error code location indicator 206, a first error code 208, a second error code 210, and an error description location indicator 212. These parameters make up a logical error definition. The error dictionary 202 may have multiple logical error definitions, and each logical error definition may have one or more error codes 208, 210.

In one embodiment, the error code location identifier 206 is an XPath expression identifying the location of an error code value in the business object 200. The error code location identifier 206 "\Child1\Child21" indicates that the error code value is an attribute located at Child1, in Child21 214.

In one embodiment, the first error code 208, and the second error code 210, are two possible error code values. Each of the error codes, the first error code 208, and the second error code 210, represent a logical error that can occur as a result of the remote function call. The error codes 208, 210 may represent the same logical error, or different logical errors. A logical error definition may have one or more error codes 208, 210.

In one embodiment, the error description location identifier 212 is an XPath expression identifying the location of a logical error description 218 associated with the error code 214 identified by the error code location identifier 206. In one embodiment, the error description identified by the error description location identifier 212 is a human readable string.

In one embodiment, the return error data 204 is embedded in the business object 200. If the remote function call encountered no logical errors, the return error data 204 does not hold an error code value signaling a logical error. If the remote function call resulted in a logical error, the return error data 204 will hold error information. The return data structure 204 has three children 214, 216, 218. The first child 214 is identified by the error code location identifier 206, and holds an error code value of "E," as defined by the first error code 208. The second child 216 holds a null or empty value. Because the remote function call resulted in a logical error, much of the data in the return data structure 204 may be empty or invalid. The third child 218 is the error description identified by the error description location identifier 212, and the third parameter 218 identifies the error as a "Customer Error." There may be more parameters in the return data structure 204, which are not relevant to the logical error, and may or may not hold valid data.

Figure 3:
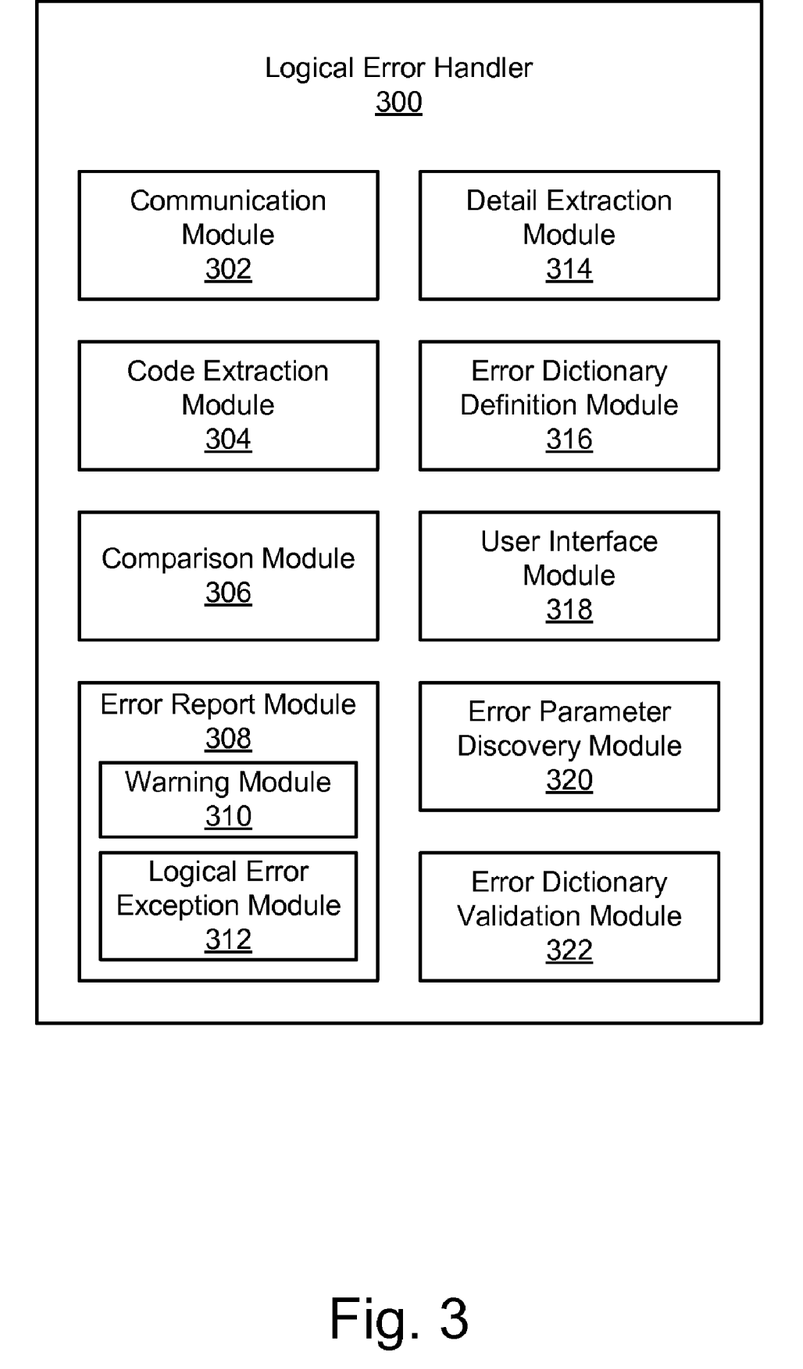
FIG. 3 is a schematic block diagram illustrating one embodiment of a logical error handler in accordance with the present invention.

FIG. 3 depicts one embodiment of a logical error handler 300 that may be substantially similar to the logical error handler 116 of FIG. 1. As described above, the logical error handler 300 discovers logical errors resulting from an EIS remote function call, and signals logical errors to the entity that made the EIS remote function call. In one embodiment, the logical error handler 116 is an SAP logical error signaling tool that may be installed on an SAP adapter. The illustrated logical error handler 300 comprises a communication module 302, a code extraction module 304, a comparison module 306, an error report module 308, a warning module 310, a logical error exception module 312, a detail extraction module 314, an error dictionary definition module 316, a user interface module 318, an error parameter discovery module 320, and an error dictionary validation module 322.

In one embodiment, the communication module 302 is the interface between the logical error handler 300 and the EIS. The communication module 302 receives a return business object from the EIS 108 in response to an EIS remote function call. In one embodiment the EIS remote function call is an SAP RFC. The return business object has an error dictionary allowing the logical error handler 300 to identify any logical errors that occurred as a result of the remote function call.

In one embodiment, the code extraction module 304 extracts an error code value from the return business object based on an error code location identifier from the error dictionary. The error dictionary is discussed in more detail with reference to FIG. 3. In one embodiment, the error dictionary has an error code location identifier. The error code location identifier may be a pointer, path, index, or XPath expression that denotes the location of an error code value in a return business object for the specific function that the business object represents. The code extraction module 304 retrieves the error code value from a return structure or the return business object by evaluating and following the error code location identifier.

In one embodiment the comparison module 306 compares the error code value to an associated error code in the error dictionary based on a comparison condition. The comparison condition may be one of a variety of mathematical conditions include equals, less-than, greater-than, or a combination of these. The comparison condition may be hard coded into the logic of the comparison module 306. Alternatively, the comparison condition may be user configurable. The associated error code may be part of the same logical error definition as the error code location identifier from the error dictionary. In one embodiment, the associated error code in the error dictionary is one or more possible error code values. Each possible error code value may be associated with a logical error that can occur in an EIS remote function call. The possible error codes may represent the same logical errors, or different logical errors. If a logical error did occur, an error code value satisfying the comparison condition will be in the field denoted by the error code location identifier. The comparison module 306 compares the error code value that was retrieved by the code extraction module 304 to the list of possible error code values in the error dictionary based on the comparison condition. If the retrieved error code value matches any of the possible error code values based on the comparison condition, then a logical error has occurred. If another value was retrieved from the business object that does not match one of the possible error code values from the error dictionary based on the comparison condition, then no logical error has occurred.

In one embodiment, if the comparison module 306 found an error code that matches the error code value extracted from the business object based on the comparison condition, the error report module 308 signals a logical error for the remote function call. The error signal can take different forms. In one embodiment, the error report module 308 uses the warning module 310 to record the logical error in an error log that is accessible to the calling entity. The error log may be a file, a business object, or another data structure that the calling entity can receive or access for information about the logical error. In another embodiment, the error report module 308 uses the logical error exception module 312 to throw an exception having the error code value and/or a description of the logical error that occurred. The error report module 308 may use the warning module 310 for certain errors, and the logical error exception module 312 for other errors. Other signals may also be employed. In one embodiment, the error report module 308 uses the logical error exception module 312 for more serious errors, and the warning module 310 for less serious errors, as defined by either the calling entity or the remote function call. Less serious errors may be identifiable by an error code value above or below a certain threshold value. In one embodiment, the error dictionary 202 includes a severity flag that the client may set to false in order receive warnings rather than having exceptions thrown.

In one embodiment, the detail extraction module 314 extracts an error description from the business object based on an error description location identifier in the error dictionary. In one embodiment, the error description location identifier is similar to the error description identifier 212 of FIG. 2. The error description location is a pointer, path, or XPath expression to a parameter in the business object with a description of the error. In one embodiment, the error description is a human readable string describing the logical error. The error description may also be a more detailed error code number, an index in an error description table, or other error description data.

In one embodiment, the error dictionary definition module 316 defines an error dictionary with one or more error parameters associated with a logical error in a remote function call. The one or more error parameters may be the error code location identifier, error code, and error description location identifier described above. In one embodiment, the error dictionary definition module 316 defines the error dictionary for another module, application, or adapter, like the client 104 of FIG. 1. In another embodiment, the error dictionary definition module 216 adds a generated error dictionary to a business object representing a remote function call. The error dictionary and the business object may be defined at some time before the time when the error dictionary and the business object are used. The error dictionary and the business object may be stored in persistent storage until needed by the calling entity, which may be the client 104 of FIG. 1.

In one embodiment, the user interface module 318 sets one or more error parameters in the error dictionary based on input from a user. The user interface module 318 may be in communication with a user through an integration broker, similar to the integration broker 102 of FIG. 1. The one or more error parameters in the error dictionary that the user interface module 318 sets may be the error code location identifier, the error code, and the error description location identifier described above. The error dictionary definition module 316 may use input from the user interface 318 to define an error dictionary.

In one embodiment, the error parameter discovery module 320 discovers one or more error parameter definitions from a remote function call. The error parameter discovery module 320 may discover the one or more error parameter definitions by calling a remote function call that will return the error parameter definitions. The error parameter discovery module 320 may also retrieve the error parameter definitions from a file or business object provided by the remote function call. In another embodiment, the error parameter discovery module 320 may use a series of one or more remote function calls having known logical errors, and extract the error parameter definitions from the return structures returned by the remote function calls. In one embodiment, the remote function call is an SAP BAPI or other RFM.

In one embodiment, the error dictionary validation module 322 validates the format and syntax of an error dictionary. The error dictionary validation module 322 may check the error dictionary for all necessary error parameters, for example that both an error code location identifier and an error code exist in the error dictionary. The error dictionary validation module 322 may also check for proper data structure formatting in the error dictionary, according to the data structure used.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
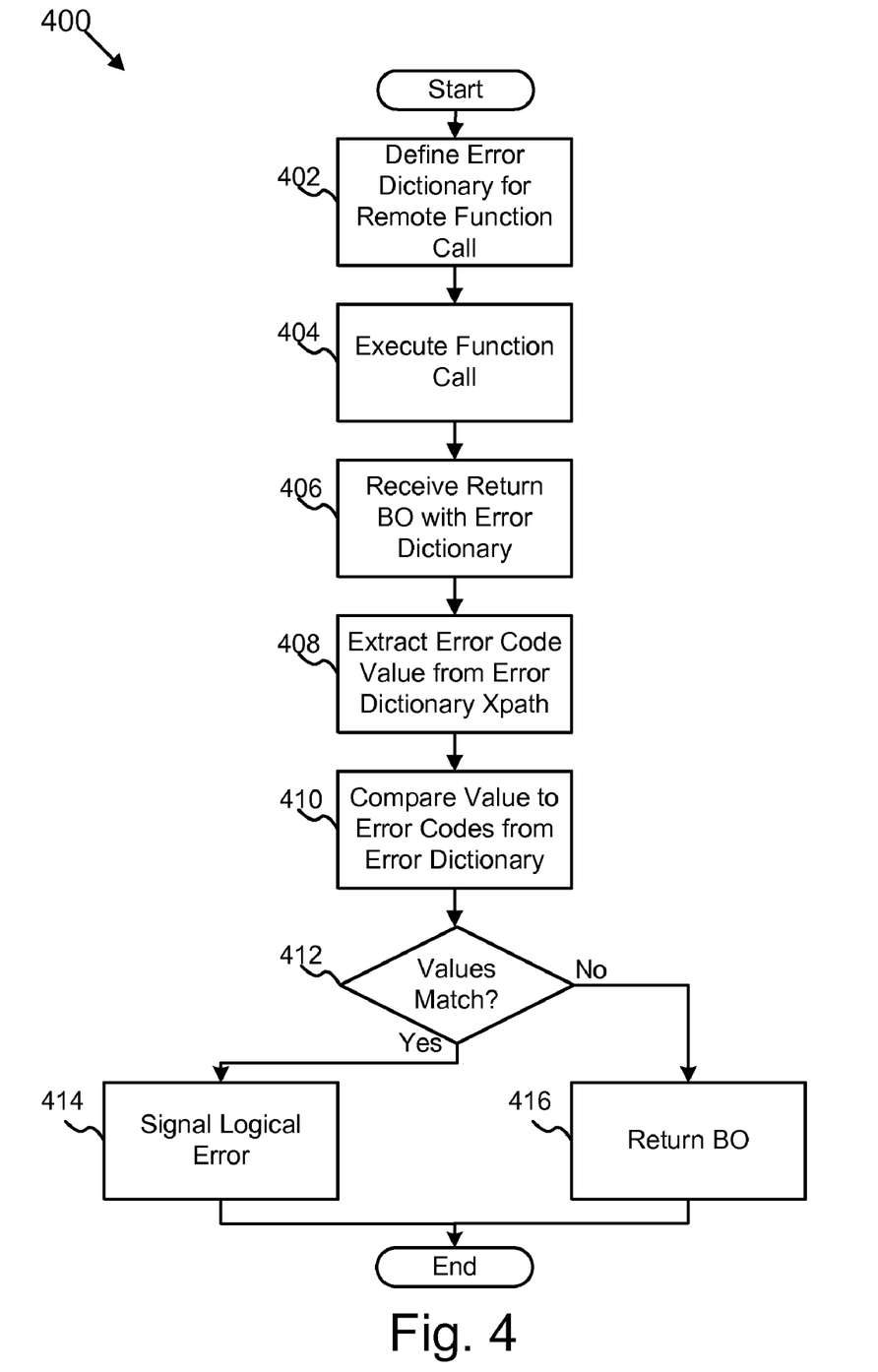
FIG. 4 is a schematic flow chart diagram illustrating one embodiment of an EIS logical error signaling method in accordance with the present invention.

FIG. 4 illustrates one embodiment of an EIS logical error signaling method 400. The error dictionary definition module 216 defines 402 an error dictionary 202 for a remote function call. The error dictionary 202 defines one or more logical errors that may occur in one or more specific remote function calls, as described above. In one embodiment, the error dictionary definition module 216 defines 402 the error dictionary 202 for the client 104. The error dictionary definition module 216 may also include the error dictionary 202 in a business object 200.

The integration adapter 106 executes 404 the remote function call associated with the error dictionary 202. The integration adapter 106 may execute 404 the remote function call at some time after the error dictionary module 216 defines 402 the error dictionary 202.

In response to the remote function call, the communication module 202 receives 406 a return business object 200 that includes the error dictionary 202 defined 402 by the error dictionary module 216. The code extraction module 204 extracts 408 an error code value from the business object 200 using the error code location identifier 206 from the error dictionary 202.

The comparison module 206 compares 410 the error code value 214 to one or more associated error codes from the error dictionary 208, 210 based on a comparison condition. If the values match 412, a logical error occurred, and the error report module 208 signals 414 the logical error to the calling entity, which may be the client 104, or another module in communication with the integration broker 102. If no value matching 412 the error code value is found in the error dictionary 202, the integration adapter 106 returns 416 the business object 200 to the calling entity.

Figure 5:
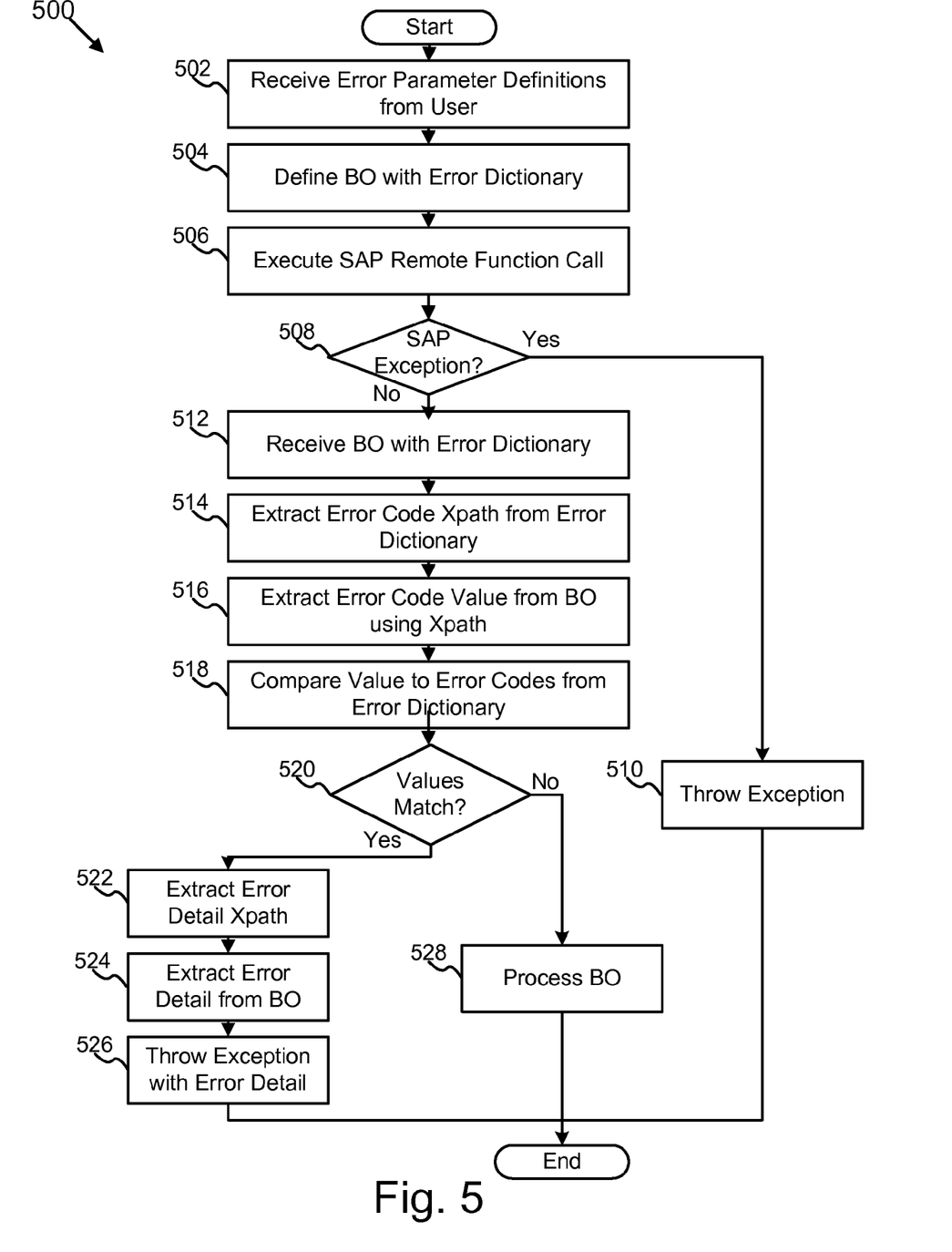
FIG. 5 is a schematic flow chart diagram illustrating one embodiment of an SAP logical error signaling method in accordance with the present invention.

FIG. 5 illustrates one embodiment of an SAP logical error signaling method 500. The error dictionary definition module 216 receives 502 one or more error parameter definitions for a logical error in an SAP RFM from the user 114. In one embodiment, the error parameter definitions comprise at least one logical error definition as described above. The error dictionary definition module 216 defines 504 a business object 200 with an error dictionary 202 containing the error information received 502 by the error dictionary definition module 216 from the user 114. The integration adapter 106 executes 506 the SAP RFC.

If the SAP RFM throws an exception 508, the integration adapter 106 will also throw 510 a similar exception to alert the calling entity. If the SAP RFM does not throw an exception 508, the communication module 202 receives 512 a return business object 200 with the error dictionary 202.

The code extraction module 204 extracts 514 an error code location identifier 206 from the error dictionary 202. The code extraction module 204 extracts 516 an error code value from the return business object using the error code location identifier 206 that the error code extraction module 204 previously extracted 514 from the error dictionary.

The comparison module 206 compares 518 the error code value 214 to one or more error codes 208, 210 listed in the error dictionary based on a comparison condition. If the values match 520, then the detail extraction module 214 extracts 522 an error description location identifier 212 from the error dictionary 202. The detail extraction module 214 extracts 524 an error description 218 from the return business object 200. The logical error exception module 212 throws 526 an exception with the error description 218 to signal the logical error to the calling entity. If the error code value 214 and the error codes 208, 210 from the error dictionary do not match 520, then the integration adapter 106 continues to process 528 the return business object 200.

Advantageously, certain embodiments of the apparatus, system, and method presented above may be implemented to signal a logical error in an EIS remote function call. Beneficially, such an apparatus, system, and method would also offer faster logical error signaling, loose error coupling, and simpler logical error discovery by handling logical errors centrally in an integration adapter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to signal a logical error in a remote function call made by an integration adapter, the apparatus comprising:

a communication module configured to receive a business object having an error dictionary in response to a remote function call, the error dictionary comprising a data structure defined within the business object, the error dictionary comprising one or more logical error definitions, each logical error definition describing one or more logical errors indicating failure of the remote function call to produce a desired result for the particular business object, each logical error definition comprising an error code, an error code location identifier, and an error description location identifier;

a code extraction module configured to extract an error code value from the business object based on the error code location identifier;

a comparison module configured to compare the error code value to the associated error code in the error dictionary based on a comparison condition;

an error report module configured to signal a logical error in the remote function call in response to the error code value and the error code satisfying the comparison condition; and wherein the communication module, code extraction module, comparison module, and error report module comprise one or more of logic hardware and executable code, the executable code stored on a computer readable storage medium.

2. The apparatus of claim 1, further comprising a detail extraction module configured to extract an error description from the business object based on the error description location identifier in the error dictionary.

3. The apparatus of claim 1, further comprising a warning module configured to record the logical error in an error log.

4. The apparatus of claim 1, further comprising a logical error exception module configured to throw an exception having the error code value in response to the logical error.

5. The apparatus of claim 1, wherein the associated error code comprises one or more error code values.

6. The apparatus of claim 1, further comprising an error dictionary definition module configured to define an error dictionary comprising one or more error parameters, the error parameters associated with a logical error in a remote function call.

7. The apparatus of claim 6, further comprising a user interface module configured to set one or more error parameters in the error dictionary based on input from a user.

8. The apparatus of claim 6, further comprising an error parameter discovery module configured to discover one or more error parameter definitions from a remote function call.

9. The apparatus of claim 6, further comprising an error dictionary validation module configured to validate the format and syntax of an error dictionary.

10. An apparatus to signal a logical error in an SAP remote function module, the apparatus comprising:
    a communication module configured to receive a business object having an error dictionary in response to an SAP remote function call, the error dictionary comprising a data structure defined as application specific information (ASI) within the business object, the error dictionary comprising one or more logical error definitions, each logical error definition describing one or more logical errors indicating failure of the SAP remote function call to produce a desired result for the particular business object, each logical error definition comprising an error code, an error code path, and an error description path;
    a code extraction module configured to extract an error code value from the business object based on the error code path;
    a comparison module configured to compare the error code value to the associated error code in the error dictionary based on a comparison condition;
    an error report module configured to signal a logical error in the SAP remote function module in response to the error code value and the error code satisfying the comparison condition; and
    wherein the communication module, code extraction module, comparison module, and error report module comprise one or more of logic hardware and executable code, the executable code stored on a computer readable storage medium.

11. The apparatus of claim 10, further comprising a detail extraction module configured to extract an error description from the business object based on the error description path in the error dictionary.

12. The apparatus of claim 10, further comprising a warning module configured to record the logical error in an error log.

13. The apparatus of claim 10, further comprising a logical error exception module configured to throw an exception having the error code value in response to the logical error.

14. The apparatus of claim 10, wherein the associated error code comprises one or more error code values.

15. The apparatus of claim 10, further comprising an error dictionary definition module configured to define an error dictionary comprising one or more error parameters, the error parameters associated with a logical error in an SAP remote function module.

16. The apparatus of claim 15, further comprising a user interface module configured to set one or more error parameters in the error dictionary based on input from a user.

17. The apparatus of claim 15, further comprising an error parameter discovery module configured to discover one or more error parameter definitions from an SAP remote function module.

18. The apparatus of claim 15, further comprising an error dictionary validation module configured to validate the format and syntax of an error dictionary.

19. A system to signal a logical error in an SAP remote function call, the system comprising:
    an integration broker executing on a processor and a memory, the integration broker configured to facilitate communication between a client and an SAP integration adapter;
    a client in communication with the integration broker, the client configured to define an error dictionary comprising one or more error parameters, the error parameters associated with a logical error in an SAP remote function module;
    an SAP adapter in communication with the integration broker;
    the SAP adapter farther comprising,
        a communication module configured to receive a business object having the error dictionary in response to an SAP remote function call, the error dictionary comprising a data structure defined as application specific information (ASI) within the business object, the error dictionary comprising one or more logical error definitions, each logical error definition describing one or more logical errors indicating failure of the SAP remote function call to produce a desired result for the particular business object, each logical error definition comprising an error code, an error code path, and an error description path;
        a code extraction module configured to extract an error code value from the business object based on the error code path;
        a comparison module configured to compare the error code value to the associated error code in the error dictionary based on a comparison condition; and
        an error report module configured to signal a logical error in the SAP remote function module in response to the error code value and the error code satisfying the comparison condition.

20. The system of claim 19, wherein the SAP adapter further comprises a detail extraction module configured to extract an error description from the business object based on the error description path in the error dictionary.

21. The system of claim 20, wherein the SAP adapter further comprises a warning module configured to record the logical error in an error log.

22. The system of claim 21, wherein the SAP adapter further comprises a logical error exception module configured to throw an exception having the error code value in response to the logical error.

23. The system of claim 22, wherein the associated error code comprises one or more error code values.

24. The system of claim 23, wherein the client further comprises a user interface configured to set one or more error parameters in the error dictionary based on input from a user.

25. The system of claim 24, wherein the client further comprises an error parameter discovery module configured to discover one or more error parameter definitions from an SAP remote function call.

26. The system of claim 25, further comprising an error dictionary validation module configured to validate the format and syntax of an error dictionary.

27. A computer program product comprising a computer readable storage medium having computer usable program code programmed to signal a logical error in an SAP remote function call, the operations of the computer program product comprising:

receiving a business object having an error dictionary in response to an SAP remote function call, the error dictionary comprising a data structure defined as application specific information (ASI) within the business object, the error dictionary comprising one or more logical error definitions, each logical error definition describing one or more logical errors indicating failure of the SAP remote function call to produce a desired result for the particular business object, each logical error definition comprising an error code, an error code path, and an error description path;

extracting an error code value from the business object based on the error code path;

comparing the error code value to the associated error code in the error dictionary based on a comparison condition; and signaling a logical error in the SAP remote function module in response to the error code value and the error code satisfying the comparison condition.

28. The computer program product of claim 27, further comprising extracting an error description from the business object based on the error description path in the error dictionary.

29. The computer program product of claim 27, further comprising recording the logical error in an error log.

30. The computer program product of claim 27, further comprising throwing an exception having the error code value in response to the logical error.

31. The computer program product of claim 27, wherein the associated error code comprises one or more error code values.

32. The computer program product of claim 27, further comprising defining an error dictionary comprising one or more error parameters, the error parameters associated with a logical error in an SAP remote function module.

33. The computer program of claim 32, further comprising setting one or more error parameters in the error dictionary based on input from a user.

34. The computer program of claim 32, further comprising discovering one or more error parameter definitions from an SAP remote function module.

35. The computer program of claim 32, further comprising validating the format and syntax of an error dictionary.

36. A method for providing SAP remote function call logical error signaling for a customer, the method comprising:

installing an SAP logical error signaling tool on an SAP adapter; and executing the SAP logical error signaling tool configured to:

receive a business object having an error dictionary in response to an SAP remote function call, the error dictionary comprising a data structure defined as application specific information (ASI) within the business object, the error dictionary comprising one or more logical error definitions, each logical error definition describing one or more logical errors indicating failure of the SAP remote function call to produce a desired result for the particular business object, each logical error definition comprising an error code, an error code path, and an error description path;

extract an error code value from the business object based on the error code path;

compare the error code value to the associated error code in the error dictionary based on a comparison condition; and signal a logical error in the SAP remote function module in response to the error code value and the error code satisfying the comparison condition.

\* \* \* \* \*